United States Patent
Frawley et al.

[11] Patent Number: 6,134,879
[45] Date of Patent: Oct. 24, 2000

[54] SUPPRESSION SYSTEM FOR A GAS TURBINE ENGINE

[75] Inventors: Robert C. Frawley, Shelton, Conn.; Armand F. Amelio, Yonkers, N.Y.; Richard S. Barnard, Monroe, Conn.

[73] Assignee: United Technologies Corporation, Stratford, Conn.

[21] Appl. No.: 07/454,167

[22] Filed: Dec. 21, 1989

[51] Int. Cl.[7] ..................................................... F02K 1/44
[52] U.S. Cl. .................. 60/39.5; 239/127.3; 239/265.17; 342/2
[58] Field of Search .......................... 60/39.5, 319, 320; 239/127.3, 265.17, 265.19, 265.35; 342/2

[56] References Cited

U.S. PATENT DOCUMENTS

| 3,212,700 | 10/1965 | Guienne et al. | 230/103 |
|---|---|---|---|
| 3,628,885 | 12/1971 | Sidenstick et al. | 416/97 |
| 3,921,906 | 11/1975 | Nye et al. | 239/127.3 |
| 3,981,448 | 9/1976 | Demogenes et al. | 239/127.3 |
| 4,084,161 | 4/1978 | Manning et al. | 342/2 |
| 4,198,817 | 4/1980 | Fujita et al. | 60/319 |
| 4,830,315 | 5/1989 | Presz, Jr. et al. | 244/200 |
| 4,924,228 | 5/1990 | Novak et al. | 342/2 |

FOREIGN PATENT DOCUMENTS 3129305  1/1989  Germany.

*Primary Examiner*—Harold J. Tudor
*Attorney, Agent, or Firm*—William J. Sapone

[57] ABSTRACT

A suppression system for a gas turbine engine uses a tapered exhaust manifold with a plurality of exhaust nozzles acting in conjunction with a plurality of mixing cells to produce cooling of an exhaust gas stream upon exit from an aircraft. The cooling air is supplied to the mixing cells in such a way that the walls of the cells are inherently maintained at a desired temperature without the use of dedicated cooling apparatus such as finned head exchangers, film cooling slots, etc. This approach allows the typically conflicting requirements of low IR signature and low radar cross section to be simultaneously satisfied in an efficient, light weight and low cost manner. The exhaust gas suppression system is preferably disposed in the tail section of a helicopter aircraft, having nozzles pointing in an essentially downward direction to reduce the threat from an over flying aircraft while minimizing the ability of ground based systems to acquire a direct line of sight on any hot surfaces or to detect the exhaust cavity using radar.

19 Claims, 2 Drawing Sheets

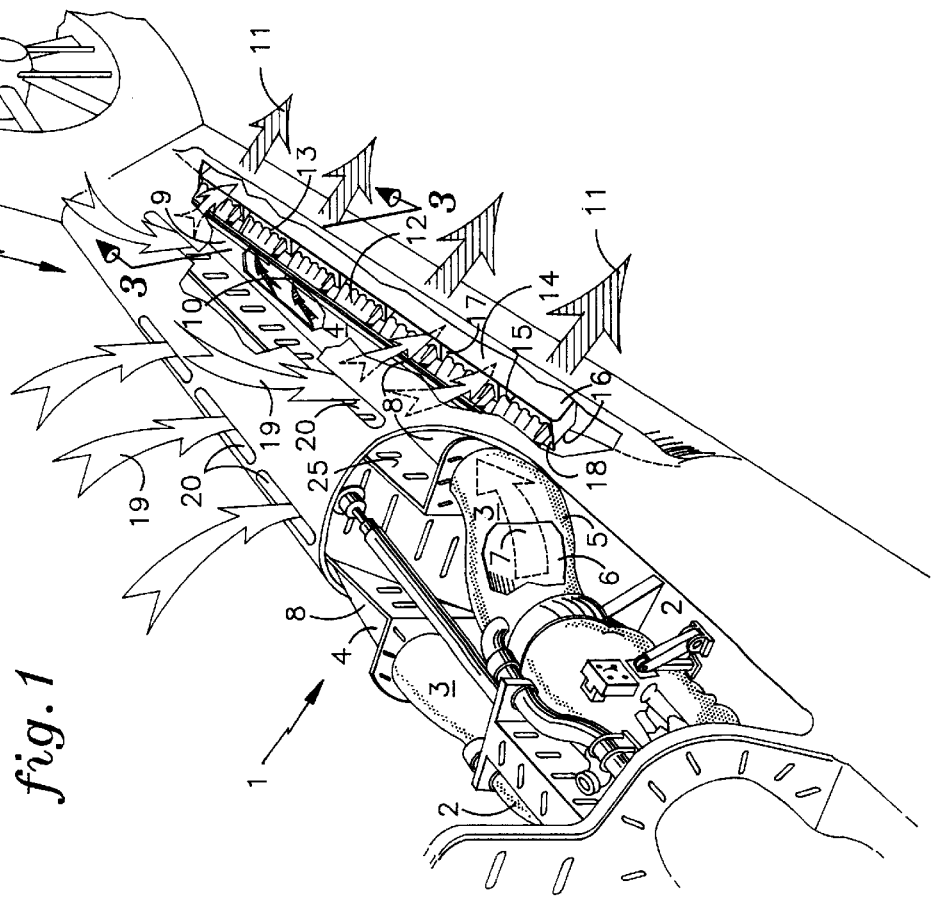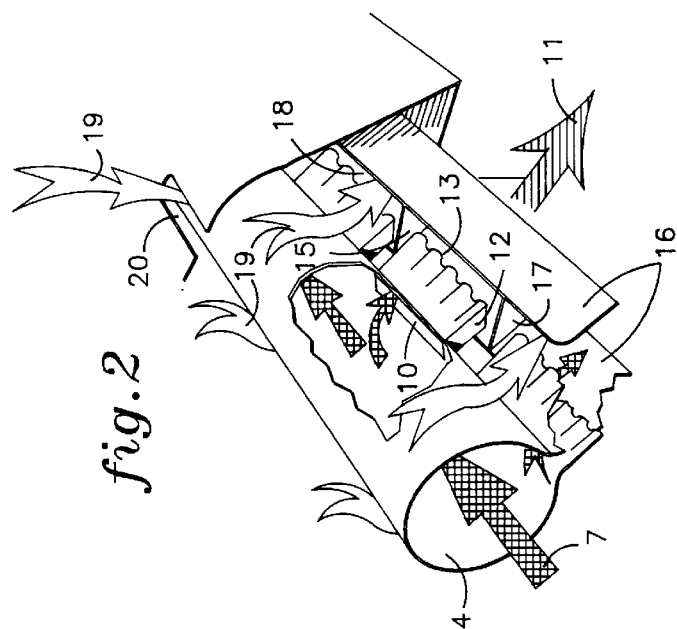

SUPPRESSION SYSTEM FOR A GAS TURBINE ENGINE

TECHNICAL FIELD

This invention relates to infrared suppression systems for gas turbine engines, and, more particularly, to an infrared suppression system which minimizes radar reflection.

BACKGROUND OF THE INVENTION

The evolution in design of military aircraft is generally determined by the aircraft mission and the type of threat which the aircraft will encounter. For example, most military aircraft are dependent for propulsion on gas turbine engines which typically produce hot surfaces and a hot exhaust plume, emitting an infrared signal which makes the aircraft vulnerable to attack by heat seeking weapons. Consequently, various suppression systems have been proposed for reducing the infrared signal emanating from either the hot exhaust plume or the hot parts. Typically, the means for reducing the infrared signal has involved mixing cooling air with the engine exhaust to lower its temperature and thus the plume infrared signal, as well as incorporating sufficient blockage via baffles or turning in the exhaust stream to prevent a direct "line of sight" to the hot engine parts, as shown, for example, in U.S. Pat. No. 3,921,906 to Nye et al.; U.S. Pat. No. 3,981,448 to Demogenes et al.; and U.S. Pat. No. 4,198,817 to Fijita et al. A cooling duct is usually provided around the engine to insulate the engine and prevent the hot metal parts from being exposed at the surface of the aircraft.

Another threat which influences the design of military aircraft is the radar cross section (RCS) which, due to material type or shape, generates a radar return signal which indicates the presence of the aircraft and/or can be used for directing radar guided weapons to the aircraft. To minimize the radar cross section of the aircraft, surface structures and apertures are typically designed to minimize their radar reflection characteristics. In addition, radar absorbing coatings or materials of construction are used to reduce radar reflection.

However, one of the areas where difficulties occur in reducing the radar cross section is in the exhaust system. In general, reducing the radar cross section of any cavity is accomplished by reshaping and/or by applying special material coatings over the cavity surfaces. However, conventional radar absorbing materials cannot be used in the area around the infrared suppression system due to the resulting high temperatures associated with that treated area of the suppressor, which would damage the coatings or materials.

The shaping of the suppression system is normally determined by physical constraints required for optimizing engine efficiency and infrared suppression, such as gas flow, back pressure minimization, etc., which inherently results in a system susceptible to generating a strong radar return signal. Thus, the typical shaping methods for reducing radar cross section cannot be applied to conventional suppression systems as they would detrimentally effect engine efficiency or the systems' ability to effectively suppress the infrared signal. Consequently, a suppression system for a gas turbine engine which minimizes the threat from both heat seeking and radar guided weapons needs to be developed.

SUMMARY OF THE INVENTION

According to the present invention, an infrared suppression system for a gas turbine engine mixes ambient air with the engine exhaust to lower the infrared signal emitted by the exhaust, the exhaust gas and the ambient air being brought together in such a way that a thin ribbon of a cooler mixture of exhaust gas and ambient air is achieved and those surfaces requiring a minimized radar cross section are sufficiently cool to allow use of conventional radar absorbing materials or coatings.

A BRIEF DESCRIPTION OF THE DRAWINGS

FIG. 1 is a partially sectioned perspective view of the suppression system, shown installed in a helicopter.

FIG. 2 is a partial view of the suppression system of the present invention.

DETAILED DESCRIPTION OF THE INVENTION

Figure 3:
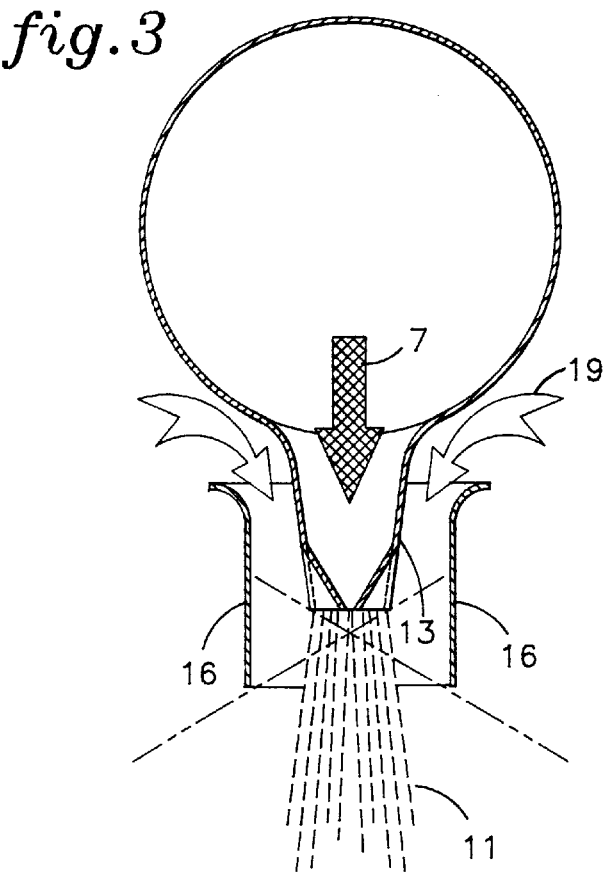
FIG. 3 is a cross sectional view taken along the line 3—3 of FIG. 1.

FIG. 1 is a partial sectioned view of the exhaust gas system of the present invention incorporated in a helicopter. The helicopter 1 has a pair of gas turbine engines 2, exhausting through a pair of exhaust ducts 3 which lead to a pair of tapered exhaust manifolds 4. The gas turbine engines 2 are covered by an insulated cowling (not shown), to avoid presenting hot metal surfaces which emit an infrared signal. The exhaust gas ducts 3 leading to the exhaust gas manifolds 4 are double ducts, having an outer duct 5 covering an inner duct 6. Cooling air flows between the ducts 5 and 6, with a hot exhaust stream, indicated by arrow 7, passing through the inner duct 6. The cooling air may be supplied through openings in the cowling covering the gas turbine engines, with scoops for providing a ram effect. However, other means for cooling the engine and exhaust ducts may be used without varying from the present invention.

Figure 4:
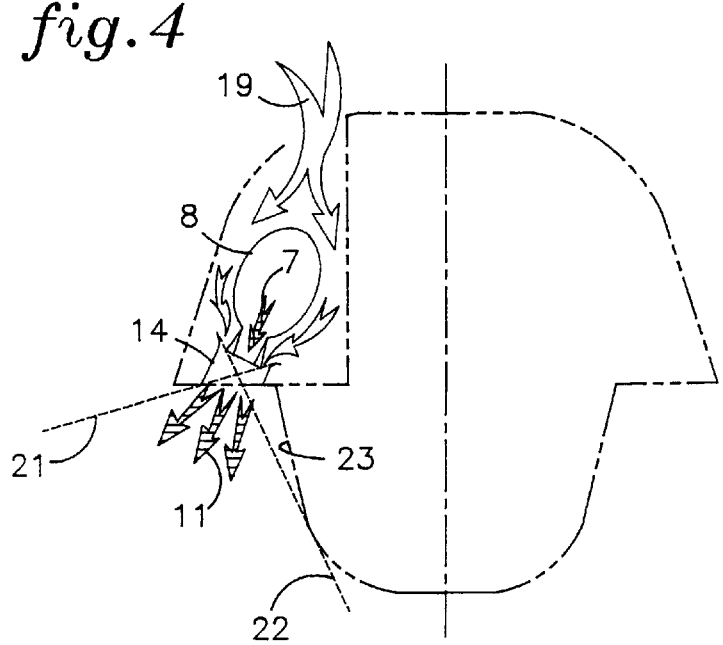
FIG. 4 is a partial sectional view of the exhaust manifold usable with the suppression system of the present invention.

The exhaust ducts 3 lead to the exhaust manifolds 4 which are tapered from a forward end 8 to a rearward end 9. Each of the exhaust manifolds 4 has one or more exit openings 10 on a lower portion thereof. While one opening could be used, it is preferable to use a plurality of openings. In either case, the total open area of the openings should preferably equal the inlet cross sectional area of the exhaust duct. This minimizes back pressure within the system. Of course, back pressure affects engine performance and should be minimized to maintain optimum engine efficiency. However, in certain applications, it may be advantageous to vary the total open area relative to the inlet area to adjust performance characteristics. The exhaust manifold is tapered to have a progressively decreasing cross sectional area from the forward end 8 to the rearward end 9, to maintain a constant gas velocity through the manifold. The exhaust manifold may have a variety of cross sectional shapes, such as round, oval, square, etc. As best seen in FIG. 4, the manifold 4 has an oval shape.

The openings 10 are axially disposed along the exhaust manifold and provided normal to the exhaust manifold, and to the aircraft, to take advantage of a disruptive cross flow effect which occurs as an exhaust plume, indicated by arrow 11, enters the atmosphere during forward motion. The length of the manifold should be sufficient to provide a minimized opening width to provide a thin ribbon of exhaust. Such a thin ribbon is more easily and readily dissipated into the surrounding atmosphere upon discharge from the aircraft. The relationship between manifold taper and opening area is such that near constant gas pressure and velocity is maintained through the entire manifold length.

Each opening 10 has an associated mixing nozzle 12 attached to the exhaust manifold. While the system would operate without a mixing nozzle, it is preferable to use a mixing nozzle to increase the mixing efficiency of the system. The nozzles may be integrally formed with the exhaust manifold or they may be separately produced and fastened to the exhaust manifold by conventional means such as by using screw fasteners.

In a preferred embodiment, each nozzle incorporates a lobe design 13 which does not promote the outward propagation of the hot exhaust gas flow. In the preferred embodiment, a convergent lobe design is utilized to mix the hot exhaust gas and cooling air into a thin ribbon, with the flows nearly mixed upon exit from the aircraft. The lobe design generally comprises a wavy pattern. Some examples of various lobe designs are disclosed in U.S. Pat. No. 4,830,315 to Presz, Jr. et al., which is hereby incorporated by reference. However, the present invention is not limited to a particular lobe design, and is believed to encompass other nozzle configurations used for discharging exhaust gas from an exhaust manifold.

A mixing duct 14, having a plurality of mixing cells 15, is disposed parallel and substantially normal to the exhaust manifold, with each individual cell corresponding to an individual opening 10 and nozzle 12. The mixing duct has two longitudinal sidewalls 16 connected to each other by a series of transverse baffles 17, defining the series of rectangular cells 15, each cell surrounding a single nozzle to form an individual ejector assembly. The mixing duct is spaced apart from the exhaust manifold to provide an inlet space 18 between the exhaust manifold and the sidewalls. The depth of the cells, determined by the width of the sidewalls, must be minimized to reduce pressure losses but maximized to limit the line of sight to the hot exhaust nozzles.

The mixing duct may be attached directly to the exhaust manifold by conventional means or may be located adjacent to the manifold through attachment to the associated airframe.

Referring to FIG. 2, an enlarged cross section of the exhaust manifold, nozzle and mixing duct is shown. The exhaust gas exits through the nozzle which may have a shaped surface to increase mixing efficiency between the exhaust gas and the cooling air. As is shown in FIG. 3, the exhaust gas is shaped by the nozzle to produce the thin exhaust ribbon 11 which passes through the mixing duct without allowing the exhaust gas to substantially impinge upon the duct sidewalls. This is necessary to minimize heating of the mixing duct sidewalls 16, to prevent generation of an infrared signal and to provide a benign temperature environment for radar absorbing coatings. Additionally, the production of a thin exhaust ribbon allows minimizing the spacing between the adjacent sidewalls, further limiting the line of sight into the exhaust manifold.

Within each cell, the exhaust stream is mixed with cooling air to lower the exhaust gas temperature. The nozzles extend partially into the mixing cells. As the exhaust is discharged from the nozzles, through the mixing cells, a venturi effect is created, drawing ambient air, indicated by arrow 19, from slots 20, in the airframe through the mixing cells surrounding the nozzles. The air is introduced to the exhaust gas in the mixing duct and mixed upon discharge, with the mixture at a substantially cooler temperature, thus lowering the intensity of the infrared signal. Generally, the air to exhaust ratio may range from 0.5:1, air to gas to 1.5:1. A mixing ratio of about 1:1 is preferred. Where a lobed nozzle configuration is used, the venturi effect is enhanced, increasing the air to gas ratio.

The cooling air maintains the mixing duct sidewalls 16 and baffles 17 at a relatively low temperature through the use of a film of cooling air. To accomplish this, the openings and nozzles are designed to provide a thin ribbon of exhaust within the mixing cell, allowing the cooling air to form a barrier layer around the cell walls. This may be accomplished by using a converging nozzle which promotes formation of a thin exhaust plume, as opposed to a diverging nozzle which promotes spreading of the exhaust within the cell. Of course, other flow directing means which produce a thin exhaust plume may also be used. The spacing between the sidewalls is minimized since the exhaust exits as a thin ribbon, limiting a direct line of sight to the exhaust nozzles. At the same time, the sidewalls are spread enough to prevent impingement of the exhaust gas on the sidewalls.

Since the mixing duct forms the cavity from which the exhaust gas will exit the airframe, it is in these areas where shaping and radar absorbing materials must be used to assure a minimized radar cross section. Referring to FIG. 4, the duct 14 has a minimum width to minimize the cavity size as well as limiting a line of sight into the aircraft, indicated by lines 21 and 22. The cooling air pattern protects the sidewalls to allow coating the sidewalls with materials which will reduce the radar reflectance characteristics of the cavity. In addition, the surface 23 of the aircraft may be coated, without fear of heat damage, due to the orientation of the exhaust nozzle, efficient exhaust gas cooling and the thin ribbon plume. Thus, the present invention minimizes the threat from both heat seeking and radar guided weapons.

In helicopters, the typical threats are from air-to-air or ground-to-air missiles, with mission requirements involving flying at low altitudes, i.e., flying "nap of the earth", to minimize susceptibility to ground attack. Consequently, it is imperative to reduce the infrared and radar detection of an aircraft flying towards a threat until such a threat is minimized due to aircraft speed, terrain masking, etc. Consequently, the suppression system of the present invention causes the exhaust plume to exit the helicopter from a tail cone section 24 of the aircraft, as shown in FIG. 1. Preferably, the exhaust exits in a substantially downward direction to minimize the ability of hostile forces to detect the aircraft, and even if detected, to react in time to successfully attack the aircraft.

The engine exhaust duct is of conventional construction made of, for example, steel or stainless steel capable of withstanding temperatures of about 1200° F. The duct is supported and attached to the airframe through a series of hangers which allow relative motion to accommodate thermal growth of the duct. A self-aligning connector attaches the exhaust duct to the exhaust manifold. This self-aligning connector is required to prevent loading of the exhaust system due to differential thermal growth of its components and airframe deflections. As shown in FIG. 1, an insulating wall 25 should be provided to protect internal systems from the hot exhaust components.

The exact length of the tapering manifold is a function of the particular installation, allowable power penalty, infrared and radar cross section goals, etc. The manifold preferably has intermittent longitudinal slotted openings along its full length. The relationship between the manifold taper and the longitudinal slots will be such that near constant gas pressure and velocity will be maintained through its entire length. Of course, other opening shapes, such as round, oval, trapezoidal, etc., may be used. The manifold can be produced from conventional materials such as steel or stainless steel, and is typically attached to and supported by the airframe.

In a preferred embodiment, screw inserts are provided along the manifold intermittent slotted openings to provide for mechanical attachment of individual nozzles onto the manifold. This allows the nozzles to be interchangeable for quick repair or replacement. The nozzles are similarly fabricated from a conventional material such as steel or stainless steel. With the use of intermittent nozzles, some spacing will be required between the individual nozzles to allow cooling of each transverse baffle. Generally, about a 2" separation between individual nozzles will provide sufficient air cooling of the transverse baffles.

With the cooling air coating the baffle sidewalls and transverse baffles, the mixing duct could be produced of a low cost composite material which reduces the radar cross section of the exhaust gas cavity. The cooling air for the system may be supplied through slots in the airframe above the exhaust manifold or may be provided through another suitable opening. Of course, the source of the cooling air is left to the discretion of the designer. It is contemplated that the engine cooling air and exhaust duct cooling air may be combined and exit through the suppression system together with the cooling air dedicated for cooling the exhaust gas stream.

It should be noted that, while the invention is described in relation to aircraft, and particularly helicopters, the inventive suppressor is adaptable to land based and marine based vehicles.

The inventive suppression system reduces the infrared signals previously encountered with exhaust systems which exit on top of the airframe thus reducing the threat from high altitude aircraft. Also, by moving the cavity to the underside of the aircraft, airborne radar is prevented from illuminating the exhaust cavity, minimizing detection from overflying aircraft. In addition, the general downward direction of the exhaust gases produces an upward thrust which assists the rotor in providing lift. The use of cooling air to prevent heating of the mixing duct sidewalls allows use of conventional radar absorbing materials and/or production by composite materials, thereby reducing the radar cross section of the exhaust cavity, further minimizing vulnerability to radar detection. This approach allows the typically conflicting requirements of low IR signature and low radar cross section to be simultaneously satisfied in an efficient, light weight and low cost manner. Consequently, the combination of design features produces an infrared and radar suppression system which enhances survivability of the aircraft.

It should be understood that the invention is not limited to the particular embodiments shown and described herein, but that various changes and modifications may be made without departing from the scope of the present invention.

We claim:

1. An infrared suppression system for a gas turbine engine which generates an exhaust gas stream comprising:
    exhaust duct means fluidically connected to the engine for directing the exhaust gas stream,
    tapered exhaust manifold means fluidically connected to said exhaust duct means, said manifold means having an inlet for receiving said exhaust stream and one or more openings disposed normal to the exhaust manifold means, said openings longitudinally aligned along the manifold means, each opening sized for allowing a portion of the exhaust stream to exit therefrom in the form of a ribbon,
    mixing duct means, disposed parallel to and spaced apart from the exhaust manifold means, and having one or more cells corresponding to the one or more openings, each cell associated with and substantially surrounding an opening, each cell having sidewalls, which are spaced away from the exhaust manifold means, to define a pair of inlets therebetween, such that exhaust gas passing through the opening creates a venturi effect within the mixing cell drawing cooling air through the inlet, the cooling air coating the sidewalls of the cell to prevent impingement of the exhaust gas of the sidewalls, the mixing duct means being composed of or coated with a radar-absorbing material.

2. The infrared suppression system of claim 1, wherein the at least one opening has an area equal to a cross sectional area of the manifold means entrance.

3. The infrared suppression system of claim 1, wherein the exhaust manifold means taper from the entrance to an end thereof, relative to the opening area, to provide a constant gas velocity through the manifold means.

4. The infrared suppression system of claim 1, wherein the exhaust manifold means includes a plurality of openings.

5. The infrared suppression system of claim 1, further comprising at least one nozzle, corresponding to the opening, each nozzle fluidically connected to an associated opening.

6. The infrared suppression system of claim 5, wherein each nozzle has shaped surfaces to increase mixing efficiency.

7. The infrared suppression system of claim 3, wherein the mixing duct means taper in correspondence with the manifold means to provide a constant inlet between the cell sidewalls and the exhaust manifold means.

8. The infrared suppression system of claim 1, wherein the mixing duct means include one or more transverse baffles, each transverse baffle cooled by a film of cooling air.

9. In a helicopter having one or more gas turbine engines and a tail cone leading to a tail rotor section, the helicopter having an infrared suppression system for each gas turbine engine which generates an exhaust gas stream, each suppression system comprising:
    exhaust duct means fluidically connected to the engine for directing the exhaust gas stream,
    tapered exhaust manifold means fluidically connected to said exhaust duct means, said manifold means having an inlet for receiving said exhaust stream and one or more openings disposed normal to the exhaust manifold means, said openings longitudinally aligned along the manifold means, each opening sized for allowing a portion of the exhaust stream to exit therefrom in the form of a ribbon,
    mixing duct means, disposed parallel to and spaced apart from the exhaust manifold means, and having one or more cells corresponding to the one or more openings, each cell associated with and substantially surrounding an opening, each cell having sidewalls, which are spaced away from the exhaust manifold means, to define a pair of inlets therebetween, such that exhaust gas passing through the opening creates a venturi effect within the mixing cell drawing cooling air through the inlet, the cooling air coating the sidewalls of the cell to prevent impingement of the exhaust gas of the sidewalls, the duct means being composed of or coated with a radar-absorbing material.

10. The infrared suppression system of claim 9, wherein the at least one opening has an area equal to a cross sectional area of the manifold means entrance.

11. The infrared suppression system of claim 9, wherein the exhaust manifold means taper from the entrance to an end thereof, relative to the opening area, to provide a constant gas velocity through the manifold means.

12. The infrared suppression system of claim 9, wherein the exhaust manifold means includes a plurality of openings.

13. The infrared suppression system of claim 9, further comprising at least one nozzle, corresponding to the at least one opening, each nozzle fluidically connected to an associated opening.

14. The infrared suppression system of claim 9, wherein each nozzle has shaped surfaces to increase mixing efficiency.

15. The infrared suppression system of claim 11, wherein the mixing duct means taper in correspondence with the manifold means to provide a constant inlet between the cell sidewalls and the exhaust manifold means.

16. The infrared suppression system of claim 9, wherein the mixing duct means include one or more transverse baffles, each transverse baffle cooled by a film of cooling air.

17. The infrared suppression system of claim 9, wherein the exhaust manifold means and mixing duct means are disposed in the tail cone of the helicopter.

18. The infrared suppression system of claim 9, wherein the exhaust manifold openings and mixing duct means are pointed in an essentially downward direction.

19. The infrared suppression system of claim 9, further comprising cooling air slots disposed on a top surface of the tail cone for supplying air to the mixing duct means.

* * * * *